United States Patent
Viegas et al.

(10) Patent No.: US 6,895,764 B2
(45) Date of Patent: May 24, 2005

(54) ENVIRONMENTALLY FRIENDLY METHOD AND APPARATUS FOR COOLING A TEMPERATURE CONTROLLED SPACE

(75) Inventors: Herman H. Viegas, Bloomington, MN (US); Jayaram Seshadri, Minneapolis, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/428,717

(22) Filed: May 2, 2003

(65) Prior Publication Data

US 2004/0216469 A1 Nov. 4, 2004

(51) Int. Cl.⁷ ............................. F17C 9/02; F25D 15/00
(52) U.S. Cl. ........................................ 62/50.2; 62/237
(58) Field of Search ....................... 62/237, 50.2, 239, 62/448, 457.9, 388, 49.1, 49.2

(56) References Cited

U.S. PATENT DOCUMENTS

| | | | |
|---|---|---|---|
| 2,036,979 A | * | 4/1936 | Askin et al. .................. 62/163 |
| 2,535,364 A | | 12/1950 | Lee |
| 2,634,589 A | * | 4/1953 | Wilson et al. ................ 62/237 |
| 2,647,376 A | * | 5/1953 | Filip ............................ 62/237 |
| 2,720,084 A | | 10/1955 | Hailey |
| 2,914,927 A | * | 12/1959 | Sebastien .................... 62/429 |
| 3,058,317 A | | 10/1962 | Putman |
| 3,121,999 A | | 2/1964 | Kasbohm et al. |
| 3,159,982 A | | 12/1964 | Schachner |
| 3,307,366 A | | 3/1967 | Smith |
| 3,314,007 A | | 4/1967 | Johnson |
| 3,421,336 A | | 1/1969 | Lichtenberger et al. |
| 3,507,128 A | | 4/1970 | Murphy et al. |
| 3,552,134 A | | 1/1971 | Arenson |
| 3,621,673 A | | 11/1971 | Foust |
| 3,662,561 A | | 5/1972 | Schroeder |
| 3,693,370 A | | 9/1972 | Miller |
| 3,694,750 A | | 9/1972 | Schuhrke |
| 3,712,073 A | | 1/1973 | Arenson |
| 3,727,423 A | | 4/1973 | Nielson |
| 3,740,961 A | | 6/1973 | Fischer |
| 3,788,091 A | | 1/1974 | Miller |
| 3,789,616 A | * | 2/1974 | Davidge ..................... 62/48.3 |
| 3,802,212 A | | 4/1974 | Martin et al. |
| 3,823,568 A | | 7/1974 | Bijasiewicz et al. |
| 3,891,925 A | | 6/1975 | Dimeff |
| 4,045,972 A | | 9/1977 | Tyree, Jr. |
| 4,050,972 A | | 9/1977 | Tyree, Jr. |
| 4,060,400 A | | 11/1977 | Williams |
| 4,082,968 A | | 4/1978 | Jones |
| 4,100,759 A | | 7/1978 | Tyree, Jr. |
| 4,165,618 A | | 8/1979 | Tyree, Jr. |
| 4,171,495 A | | 10/1979 | McNinch, Jr. |
| 4,186,562 A | | 2/1980 | Tyree, Jr. |
| 4,201,191 A | | 5/1980 | Zink et al. |
| 4,211,085 A | | 7/1980 | Tyree, Jr. |
| 4,224,801 A | | 9/1980 | Tyree, Jr. |
| 4,233,817 A | | 11/1980 | Toth |
| 4,321,796 A | | 3/1982 | Kohno |
| 4,333,318 A | | 6/1982 | Tyree, Jr. |
| 4,344,291 A | | 8/1982 | Tyree, Jr. et al. |

(Continued)

FOREIGN PATENT DOCUMENTS

FR           2217646           6/1974

*Primary Examiner*—William C. Doerrler
(74) *Attorney, Agent, or Firm*—Michael Best & Friedrich LLP

(57) ABSTRACT

An apparatus and a method for conditioning air in a plurality of spaced apart and thermally separated conditioned spaces with a cryogenic temperature control apparatus. The apparatus includes a storage tank housing a cryogen, an evaporator coil being selectively moveable into and out of thermal communication with the plurality of conditioned spaces for alternately conditioning air in the plurality of conditioned spaces, and a flow path fluidly connecting the storage tank and the evaporator coil.

32 Claims, 8 Drawing Sheets

U.S. PATENT DOCUMENTS

| | | | |
|---|---|---|---|
| 4,348,873 | A | 9/1982 | Yamauchi et al. |
| 4,350,027 | A | 9/1982 | Tyree, Jr. |
| 4,356,707 | A | 11/1982 | Tyree, Jr. et al. |
| 4,406,129 | A | 9/1983 | Mills |
| 4,439,721 | A | 3/1984 | Mura |
| 4,441,326 | A | 4/1984 | Bernauer et al. |
| 4,498,306 | A | 2/1985 | Tyree, Jr. |
| 4,543,793 | A | 10/1985 | Chellis et al. |
| 4,576,010 | A | 3/1986 | Windecker |
| 4,606,198 | A | 8/1986 | Latshaw et al. |
| 4,608,830 | A | 9/1986 | Peschka et al. |
| 4,626,781 | A | 12/1986 | Forkel |
| 4,688,390 | A | 8/1987 | Sawyer |
| 4,693,737 | A | 9/1987 | Tyree, Jr. |
| 4,695,302 | A | 9/1987 | Tyree, Jr. |
| 4,706,468 | A | 11/1987 | Howland et al. |
| 4,739,623 | A | 4/1988 | Tyree, Jr. et al. |
| 4,748,818 | A | 6/1988 | Satterness et al. |
| 4,783,972 | A | 11/1988 | Tyree, Jr. et al. |
| 4,856,285 | A | 8/1989 | Acharya et al. |
| 4,858,445 | A | 8/1989 | Rasovich |
| 4,878,362 | A | 11/1989 | Tyree, Jr. |
| 4,888,955 | A | 12/1989 | Tyree, Jr. et al. |
| 4,903,495 | A | 2/1990 | Howland et al. |
| 4,937,522 | A | 6/1990 | Gee |
| 4,940,937 | A | 7/1990 | Hattori |
| 4,941,527 | A | 7/1990 | Toth et al. |
| 4,986,086 | A | 1/1991 | de Langavant |
| 4,995,234 | A | 2/1991 | Kooy et al. |
| 5,029,288 | A | 7/1991 | Kubota et al. |
| 5,040,374 | A | 8/1991 | Micheau |
| 5,056,324 | A | 10/1991 | Haley |
| 5,056,991 | A | 10/1991 | Peschka et al. |
| 5,069,039 | A | 12/1991 | Martin |
| 5,090,209 | A | 2/1992 | Martin |
| 5,095,709 | A | 3/1992 | Billiot |
| 5,124,602 | A | 6/1992 | Nishimura et al. |
| 5,127,230 | A | 7/1992 | Neeser et al. |
| 5,147,005 | A | 9/1992 | Haeggstrom |
| 5,170,631 | A | 12/1992 | Lang et al. |
| 5,172,559 | A | 12/1992 | Renken et al. |
| 5,199,275 | A | 4/1993 | Martin |
| 5,203,179 | A | 4/1993 | Powell |
| 5,209,072 | A | 5/1993 | Truckenbrod et al. |
| 5,243,821 | A | 9/1993 | Schuck et al. |
| 5,259,198 | A | 11/1993 | Viegas et al. |
| 5,267,443 | A | 12/1993 | Roehrich et al. |
| 5,267,446 | A | 12/1993 | Viegas et al. |
| 5,285,644 | A | 2/1994 | Roehrich et al. |
| 5,287,705 | A | 2/1994 | Roehrich et al. |
| D345,009 | S | 3/1994 | Lewis et al. |
| 5,291,130 | A | 3/1994 | Kendzior |
| 5,293,748 | A | 3/1994 | Flanigan |
| 5,305,825 | A | 4/1994 | Roehrich et al. |
| 5,311,927 | A | 5/1994 | Taylor et al. |
| 5,313,787 | A | 5/1994 | Martin |
| 5,315,840 | A | 5/1994 | Viegas et al. |
| 5,317,874 | A | 6/1994 | Penswick et al. |
| 5,320,167 | A | 6/1994 | Johnson et al. |
| 5,333,460 | A | 8/1994 | Lewis et al. |
| 5,365,744 | A | 11/1994 | Viegas et al. |
| 5,396,777 | A | 3/1995 | Martin |
| 5,410,886 | A | 5/1995 | Wallace et al. |
| 5,410,890 | A | 5/1995 | Arima |
| 5,458,188 | A | 10/1995 | Roehrich et al. |
| 5,477,690 | A | 12/1995 | Gram |
| 5,511,955 | A | 4/1996 | Brown et al. |
| 5,533,340 | A | 7/1996 | Shama et al. |
| 5,557,938 | A | 9/1996 | Hanson et al. |
| 5,561,986 | A | 10/1996 | Goodall |
| 5,564,277 | A | 10/1996 | Martin |
| 5,598,709 | A | 2/1997 | Viegas et al. |
| 5,606,870 | A | 3/1997 | Lester |
| 5,669,223 | A | 9/1997 | Haley et al. |
| 5,694,776 | A | 12/1997 | Sahm |
| 5,699,670 | A | 12/1997 | Jurewicz et al. |
| 5,711,161 | A | 1/1998 | Gustafson |
| 5,711,164 | A * | 1/1998 | Slack ..................... 62/457.9 |
| 5,715,685 | A * | 2/1998 | Takasugi ..................... 62/52.1 |
| 5,730,216 | A | 3/1998 | Viegas et al. |
| 5,916,246 | A | 6/1999 | Viegas et al. |
| 5,921,090 | A | 7/1999 | Jurewicz et al. |
| 5,931,012 | A * | 8/1999 | Robertson ..................... 62/237 |
| 5,947,712 | A | 9/1999 | Viegas et al. |
| 5,979,173 | A | 11/1999 | Tyree |
| 6,006,525 | A | 12/1999 | Tyree, Jr. |
| 6,062,030 | A | 5/2000 | Viegas |
| 6,076,360 | A | 6/2000 | Viegas et al. |
| 6,086,347 | A | 7/2000 | Ryska et al. |
| 6,106,255 | A | 8/2000 | Viegas et al. |

* cited by examiner

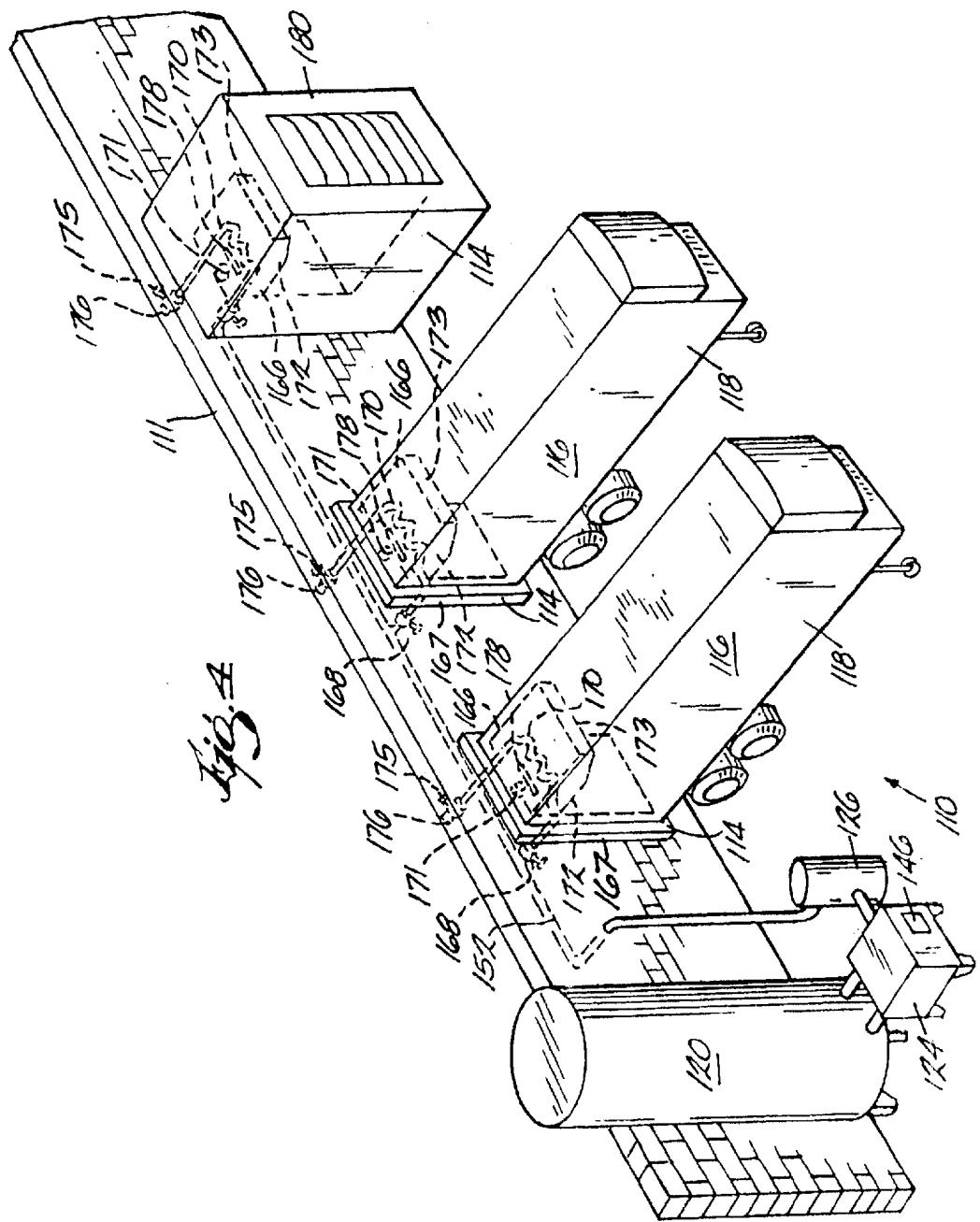

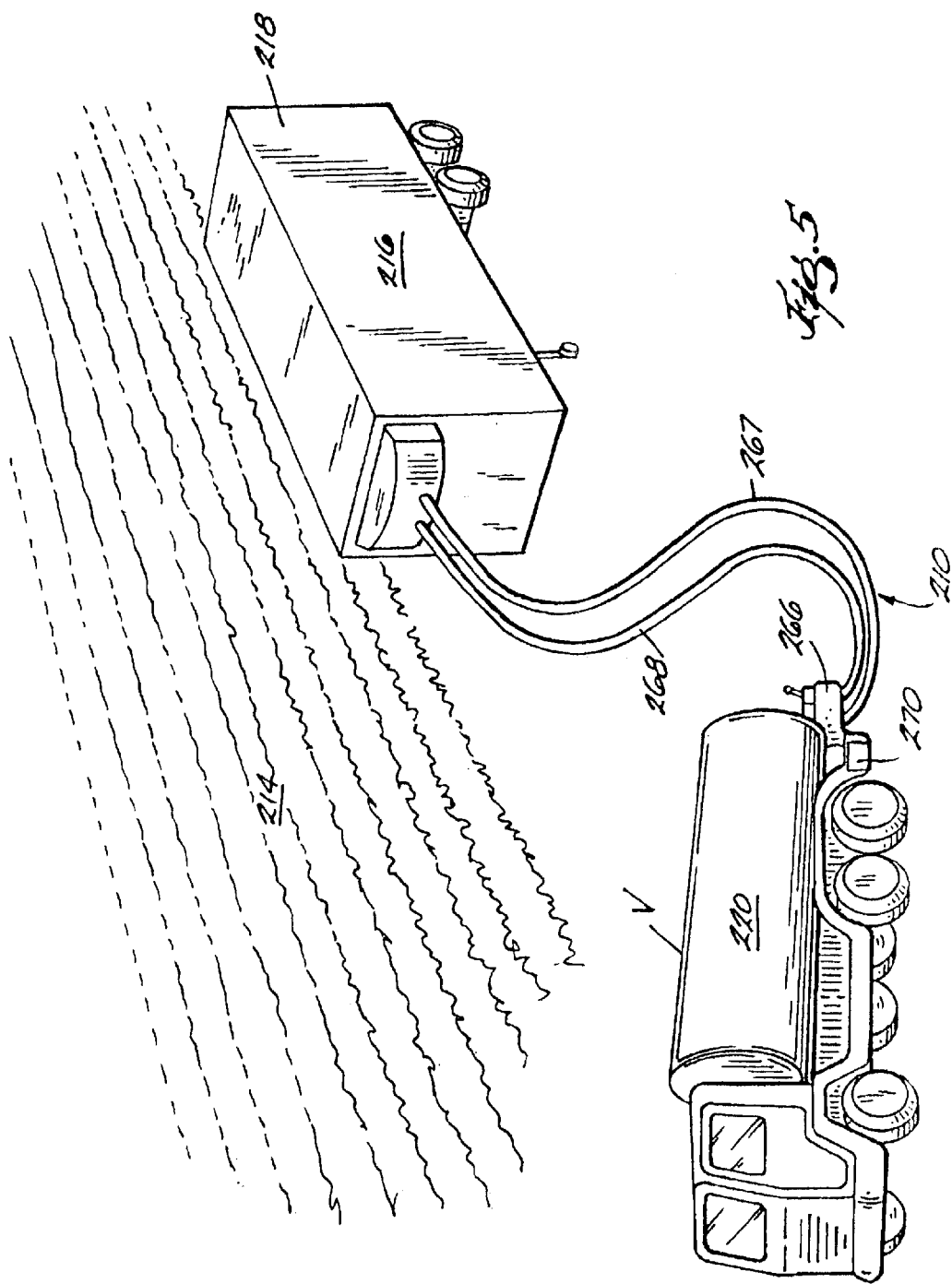

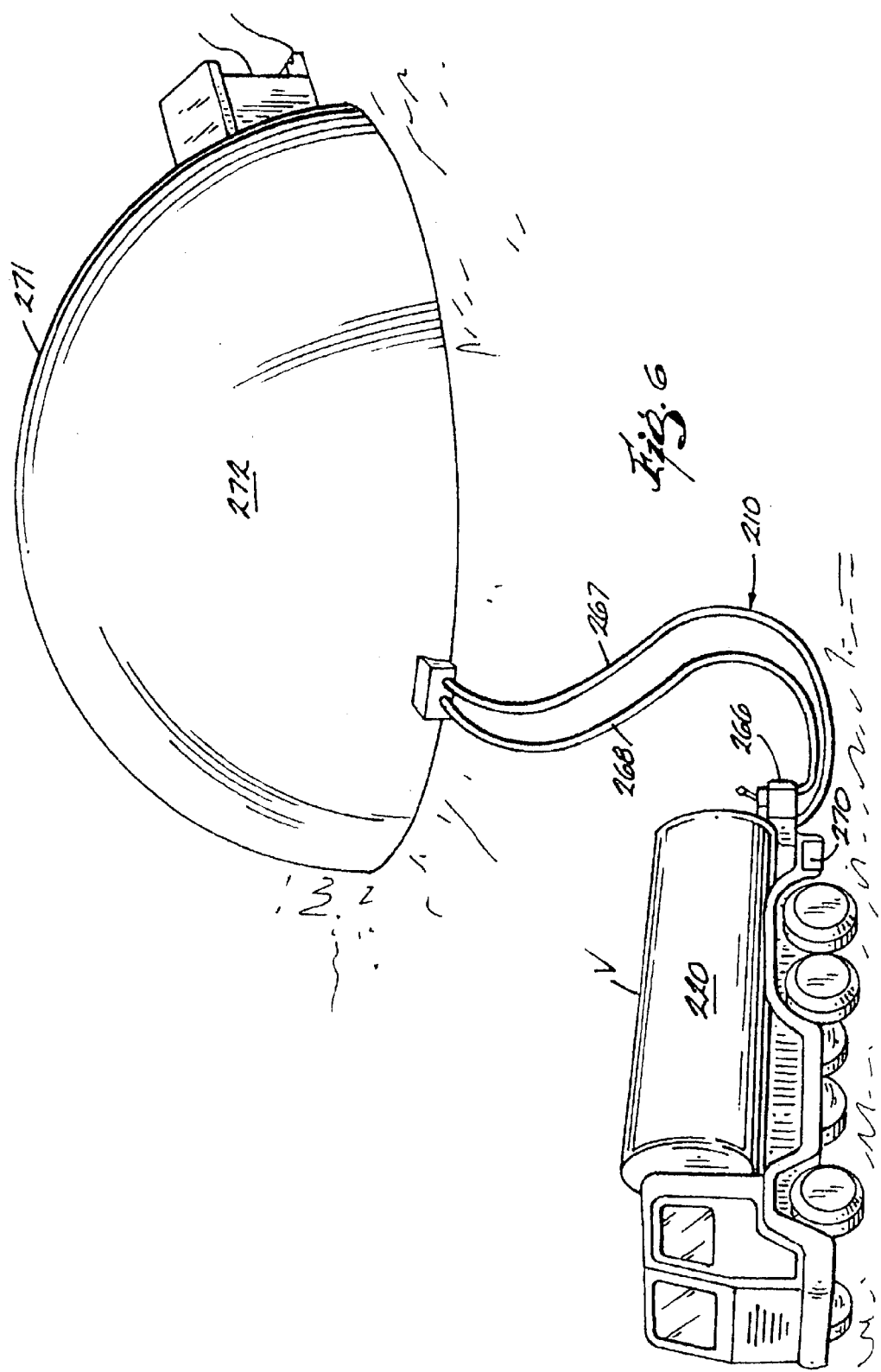

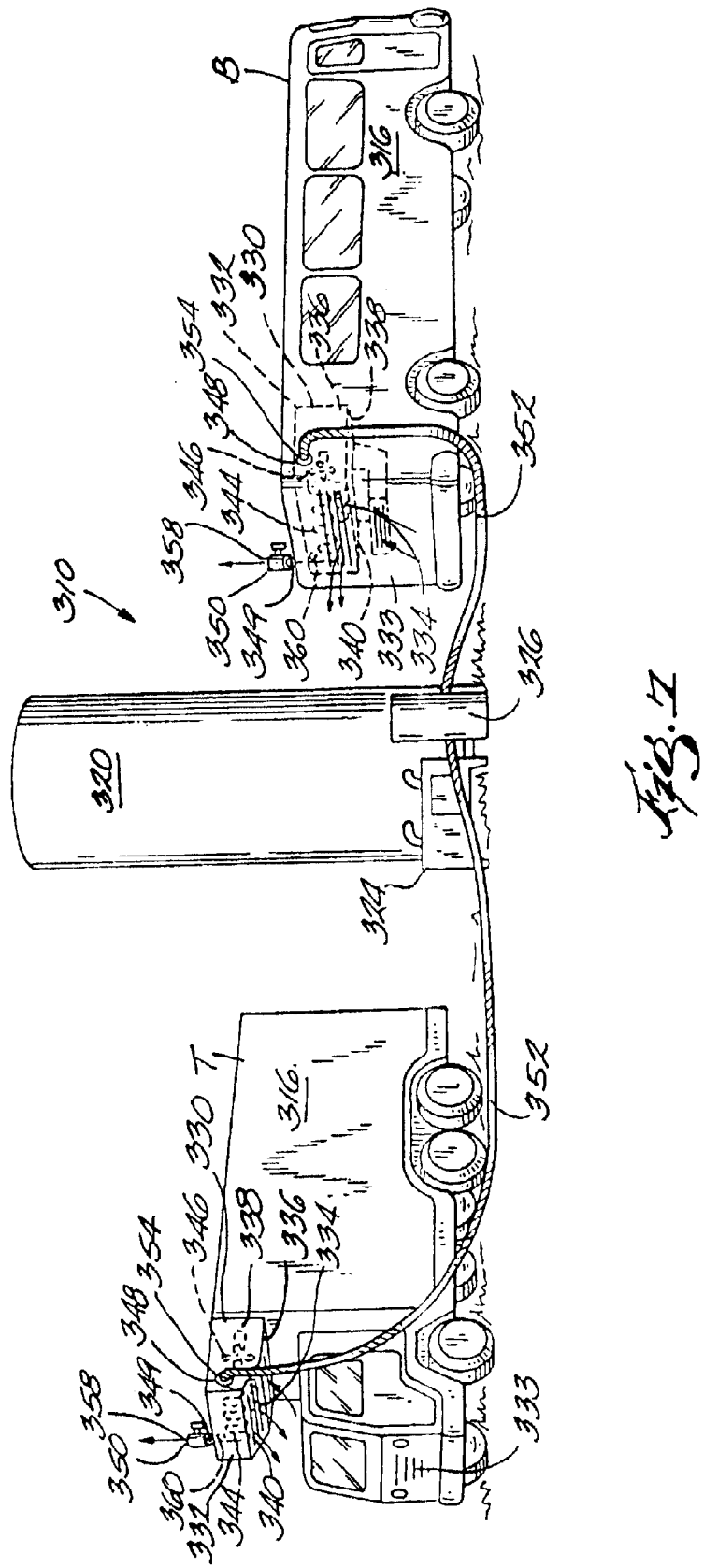

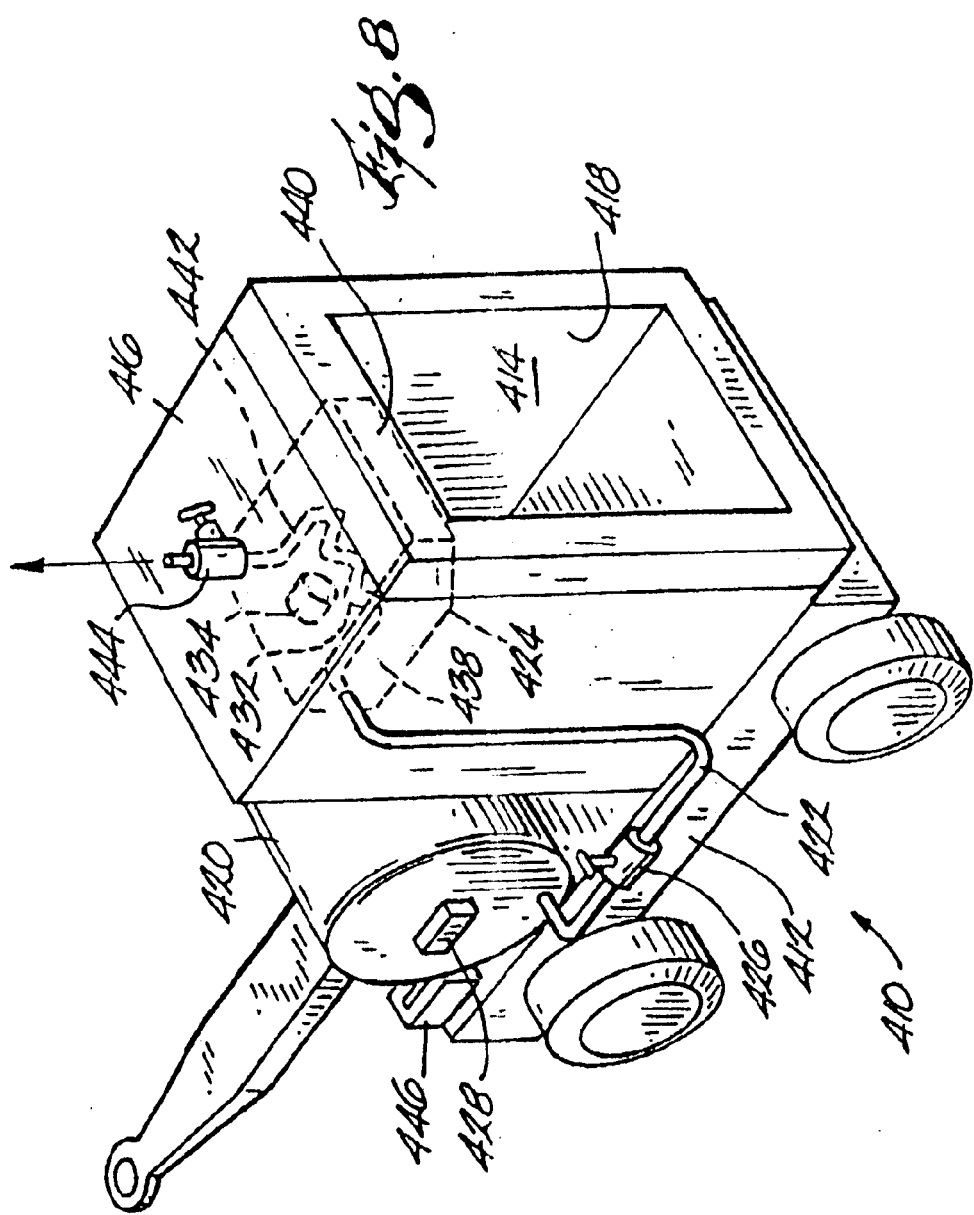

ENVIRONMENTALLY FRIENDLY METHOD AND APPARATUS FOR COOLING A TEMPERATURE CONTROLLED SPACE

FIELD OF THE INVENTION

The present invention relates generally to air conditioning and refrigeration systems, and more specifically to a cryogenic temperature control apparatus which is moveable into and out of thermal communication with a plurality of conditioned spaces to pull down the temperature of the conditioned spaces to predetermined set point temperatures.

BACKGROUND OF THE INVENTION

Conventional temperature control apparatuses are commonly used in both stationary and mobile applications. Generally, these temperature control apparatuses are used to pull down the temperature in a conditioned space to a predetermined set point temperature and to maintain the temperature of the conditioned space within a range surrounding the set point temperature.

Typically, conventional temperature control apparatuses utilize conventional refrigerants (e.g., R-12, R-134(a), and the like) in a mechanical refrigeration cycle. The mechanical refrigeration cycle requires an evaporator, a condenser, and a refrigerant compressor driven by a prime mover, such as, for example, a diesel powered internal-combustion engine.

Mobile temperature control units are commonly mounted on refrigerated containers, refrigerated straight trucks, refrigerated tractor-trailer combinations, and the like, to maintain cargo, such as foods and beverages, at or near a desired set point temperature. In other applications, temperature control apparatuses can be used to condition air in a conditioned space to improve human comfort, such as, for example, in buses and passenger trains. Temperature controlled vehicles typically include an on-board dedicated mechanical temperature control apparatus for conditioning the air in the vehicle during transportation. Generally, the dedicated temperature control apparatus is also used to pre-cool the vehicle before the vehicle is loaded so that passengers and/or cargo are not exposed to temperatures which are significantly above the desired set point temperature. Because these dedicated temperature control apparatuses are incorporated in the vehicles, they are generally small and lightweight. Consequently, these dedicated temperature control apparatuses may have low cooling capacities. Relatively high cooling capacities are required to pull down a higher temperature conditioned space to the desired set point temperature in a relatively short time. For example, a conventional mechanical temperature control apparatus can take as long as six hours to cool the interior of a refrigerated trailer from an ambient outdoor temperature of 100° F. to a desired set point temperature of –20° F. During this time, the refrigerated trailer is generally parked in a lot and cannot be used to transport product until the desired set point temperature is achieved. Similarly, buses are often parked at a depot or warehouse while the on board mechanical temperature control apparatus pulls down the temperature of the air in the bus to a comfortable predetermined set point temperature.

In remote locations, such as in rural or under developed areas and on farms, electricity and diesel fuels are often not readily available. Therefore, it is often difficult to refrigerate large quantities of agricultural products until the agricultural products can be transported from the farms to processing facilities, which may be miles away. Additionally, because electricity and diesel fuel may not be readily available, the trucks and trailers that are used to transport agricultural products to the processing facilities are often not adequately refrigerated. Moreover, during loading, the trucks and trailers are frequently opened, allowing warm air to enter the trucks and trailers. Therefore, the agricultural products may be exposed to elevated temperatures for extended periods of time after being harvested. This exposure can cause spoilage and waste, contribute to the growth of harmful bacteria and parasites, and reduce the shelf life of the agricultural products.

SUMMARY OF THE INVENTION

Conventional mechanical temperature control apparatuses generally use conventional refrigerants. Additionally, conventional mechanical temperature control apparatuses are generally powered by internal-combustion engines, which generate relatively large quantities of exhaust. Practical alternatives to temperature control apparatuses that are driven by internal-combustion engines and that use conventional refrigerants are highly desirable.

A cryogenic temperature control apparatus may be used to pull down the temperature in a conditioned space to a predetermined set point temperature. In addition, to eliminating the need for conventional refrigerants, cryogenic temperature control apparatuses do not require a compressor and the associated prime mover.

The present invention provides a cryogenic temperature control apparatus, which is moveable into thermal communication with conditioned spaces to rapidly pull down the temperature in the conditioned spaces. The cryogenic temperature control apparatus can then be moved to pull down the temperature in another conditioned space.

More particularly, the present invention provides a cryogenic temperature control apparatus for conditioning air in a plurality of conditioned spaces. The plurality of conditioned spaces are spaced apart and are thermally separated. The cryogenic temperature control apparatus includes a storage tank housing a cryogen, and an evaporator coil. The evaporator coil is selectively moveable into and out of thermal communication with the plurality of conditioned spaces for alternately conditioning air in the plurality of conditioned spaces. The cryogenic temperature control apparatus also includes a flow path fluidly connecting the storage tank and the evaporator coil.

In some constructions, the flow path is a flexible fluid conduit. The flow path includes a valve for regulating the back pressure in the evaporator coil and the flow path. At least one of the conditioned spaces is a trailer and another of the conditioned spaces is a vehicle.

In some constructions, the cryogen is carbon dioxide. The cryogenic temperature control apparatus includes a fan. The fan is in fluid communication with the evaporator coil and is oriented to selectively draw air from at least one of the plurality of conditioned spaces and to direct air across the evaporator coil. The cryogenic temperature control apparatus includes a fluid conduit, which selectively fluidly connects the evaporator coil and at least one of the plurality of conditioned spaces.

Also, the present invention provides a cryogenic temperature control apparatus for conditioning the temperature of air in a plurality of thermally separated conditioned spaces. The plurality of conditioned spaces are located in a plurality of locations. The cryogenic temperature control apparatus includes a storage tank housing a cryogen and a mobile heat exchanger. The mobile heat exchanger is moveable between the plurality of locations and is alternately thermally connectable with the plurality of conditioned spaces to alternately condition air in the plurality of conditioned spaces. The mobile heat exchanger includes an evaporator coil extending through the heat exchanger and a flow path fluidly connecting the storage tank and the evaporator coil.

Further, the present invention provides a method of controlling the temperature of a plurality of conditioned spaces with a cryogenic temperature control apparatus. The method includes the acts of removably thermally connecting the evaporator coil and at least one conditioned space, transferring cryogen through the flow path from the storage tank to the evaporator coil, transferring heat from the conditioned space to the cryogen, and moving the evaporator coil out of thermal communication with the conditioned space.

In some applications, the method includes removably thermally connecting the evaporator coil and another of the plurality of conditioned spaces, transferring cryogen through the flow path from the storage tank to the evaporator coil, transferring heat from the other conditioned space to the cryogen, and moving the evaporator coil out of thermal communication with the other conditioned space.

Other independent features of the present invention will become apparent to those skilled in the art upon review of the following detailed description, claims, and drawings.

BRIEF DESCRIPTION OF THE DRAWINGS

The present invention is further described with reference to the accompanying drawings, which show constructions of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention. Also, it is understood that the phraseology and terminology used herein is for the purpose of description and should not be regarded as limiting.

In the drawings, wherein like reference numerals indicate like parts:

FIG. 4 is a perspective view of a cryogenic temperature control apparatus embodying the invention according to a second construction in which a heat exchanger is mounted on a cooling wall;

FIG. 5 is a perspective view of a cryogenic temperature control apparatus embodying the invention according to a third construction;

FIG. 6 is a perspective view of the cryogenic temperature control apparatus shown in FIG. 5 in which the cryogenic temperature control apparatus is being used to condition the air in a temporary structure;

FIG. 7 is a perspective view of a cryogenic temperature control apparatus embodying the invention according to a fourth construction in which the cryogenic temperature control apparatus is being used to cool a bus and a truck; and FIG. 8 is a perspective view of a cryogenic temperature control apparatus embodying the invention according to a fifth construction in which the cryogenic temperature control apparatus includes a mobile cooling chamber.

DETAILED DESCRIPTION

As used in the following description and claims, the term "conditioned space" includes any space to be temperature and/or humidity controlled, including stationary and mobile applications for the preservation of foods, beverages, flowers, plants, and other temperature sensitive products, maintenance of a proper atmosphere for the shipment of perishable products, and the like. Additionally, as used herein and in the following claims, the term "vehicle" includes any moveable apparatus or element which includes a conditioned space, including but not limited to, trucks, buses, shipping containers, trailers, railcars, tractor-trailer combinations, and the like.

Figure 1:
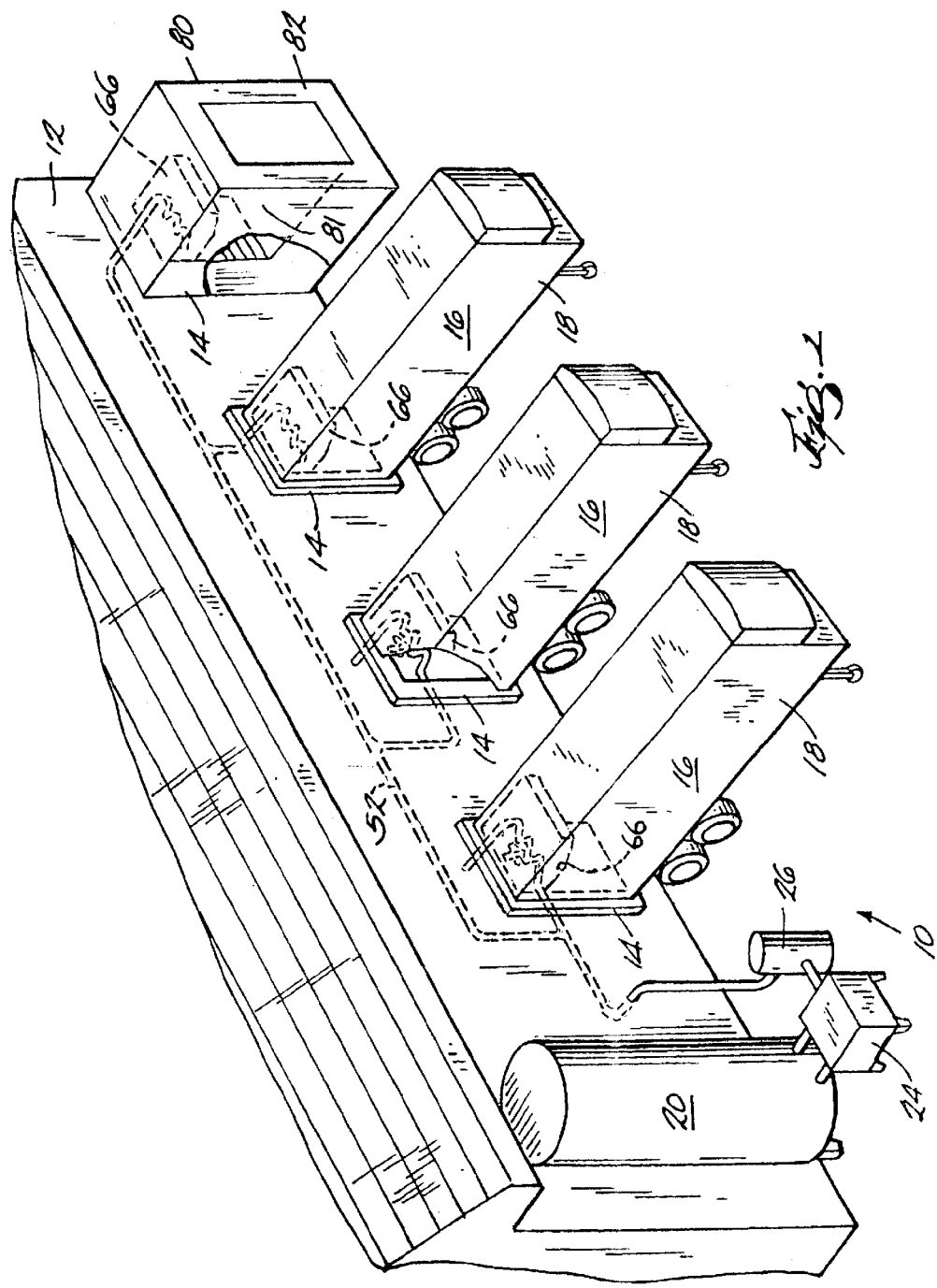
FIG. 1 is a perspective view of a loading dock including a cryogenic temperature control apparatus embodying the invention.
Figure 2:
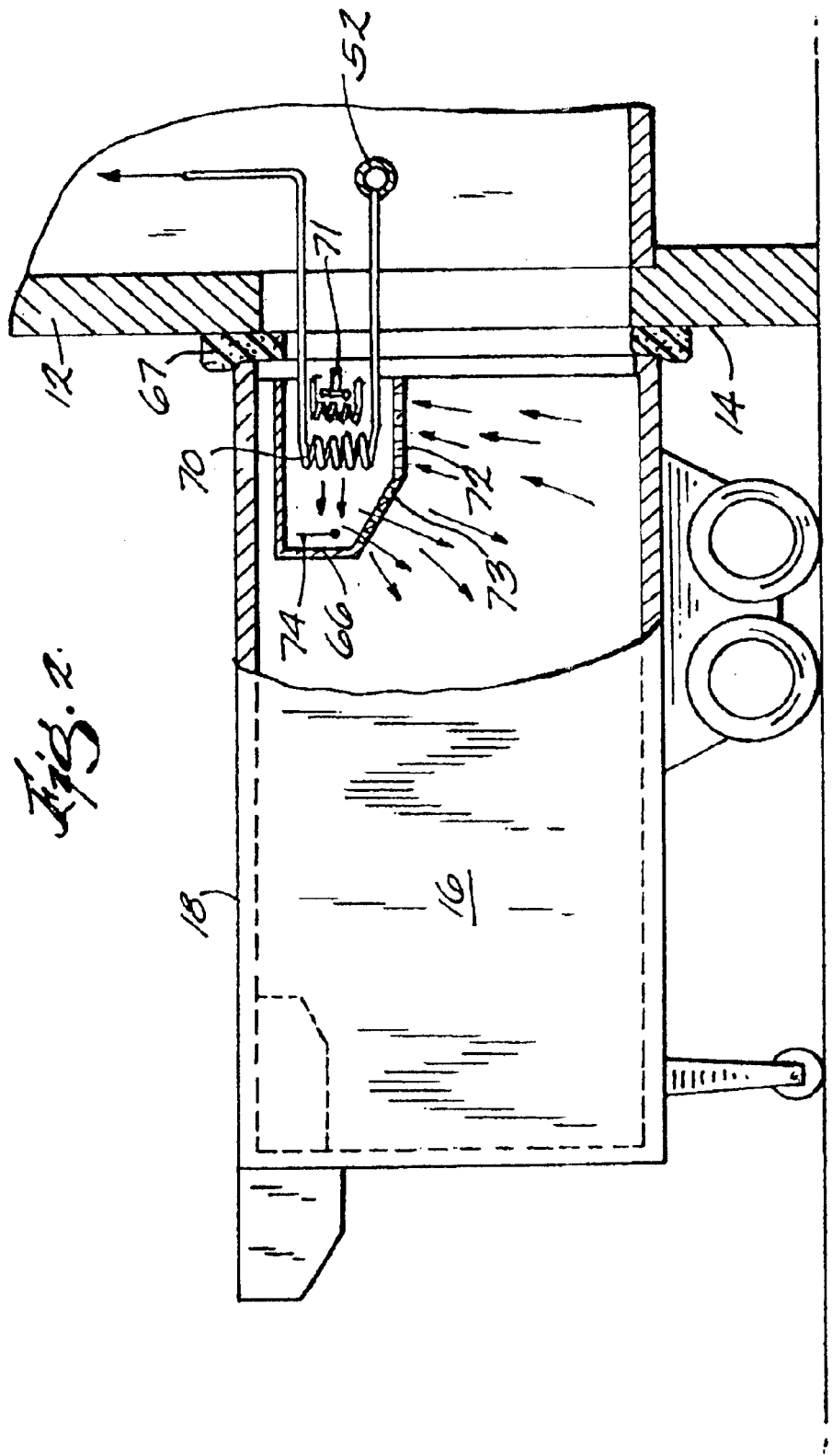
FIG. 2 is side view of a portion of the loading dock and the cryogenic temperature control apparatus shown in FIG. 1.
Figure 3:
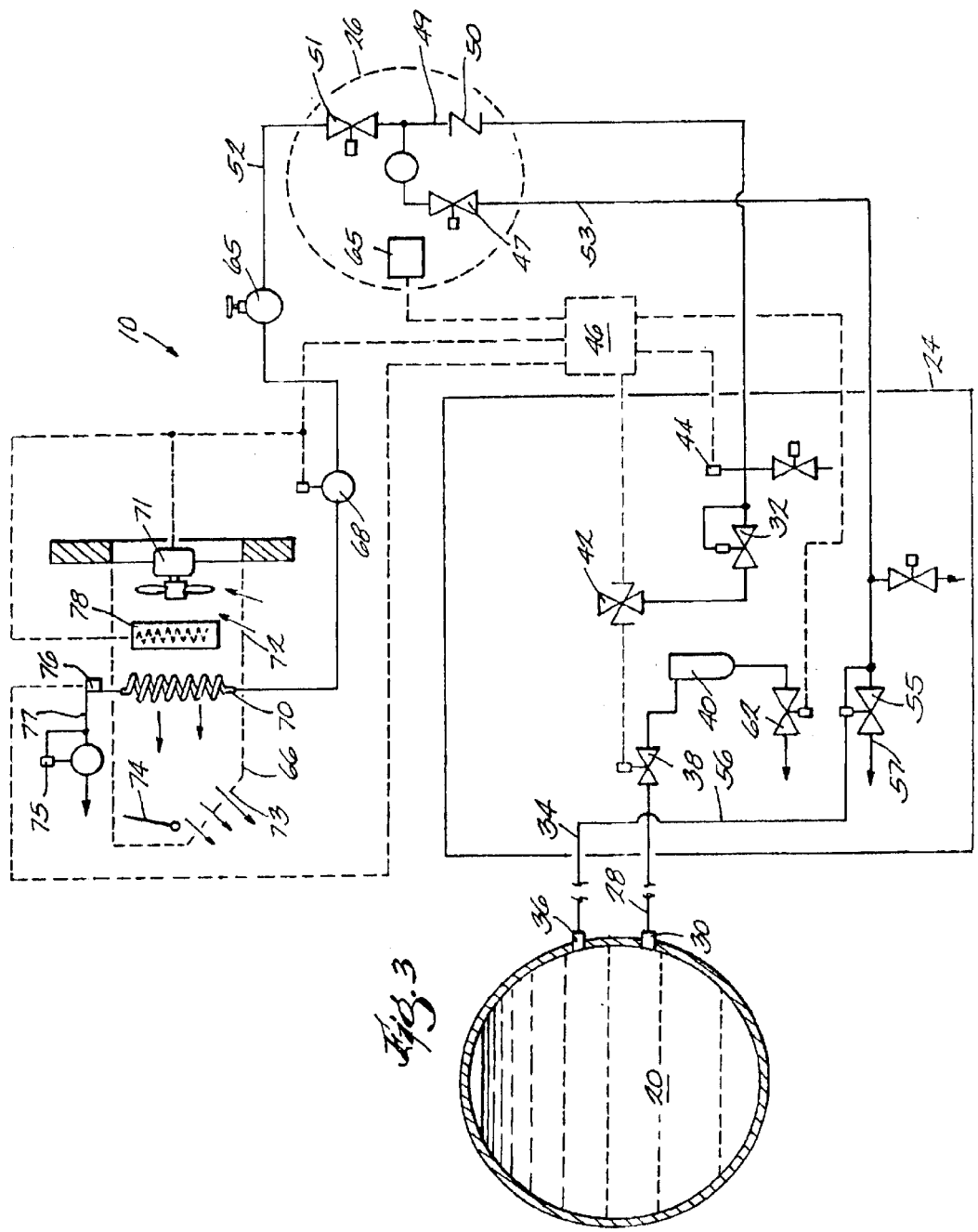
FIG. 3 is a schematic representation of the cryogenic temperature control apparatus shown in FIG. 1.

FIGS. 1–3 illustrate a cryogenic temperature control apparatus 10 according to a first construction of the present invention, which is particularly well suited for pre-cooling straight trucks and tractor-trailer combinations. In other constructions, (not shown) the cryogenic temperature control apparatus 10 can be incorporated in bus depots, warehouses, airport jet ways, supply depots, garages, and the like to condition air in other vehicles and/or buildings.

The cryogenic temperature control apparatus 10 shown in FIG. 1 is incorporated in a truck loading dock 12 with four docking stalls 14. Trailers 18 are parked at three of the docking stalls 14 and define conditioned spaces 16. The temperature control apparatus 10 of the present invention is preferably operable to rapidly pull down the temperatures in the conditioned spaces 16 to predetermined set point temperatures. In some applications, the temperature control apparatus 10 may also be used to maintain the temperature in one or more of the conditioned spaces 16 at the set point temperatures. In particular, the temperature control apparatus 10 can be used to maintain the temperature of trucks and trailers 18 while the trucks and trailers 18 are parked at the docking stalls 14 for extended periods of time. This is particularly helpful in cities and states, which prohibit the use of diesel-powered mechanical refrigeration units for cooling parked trucks and trailers.

The cryogenic temperature control apparatus 10 includes a thermally insulated or vacuum insulated storage tank 20, which is adjacent to the loading dock 12. As shown in FIG. 3, the storage tank 20 contains a supply of cryogen, such as carbon dioxide ($CO_2$) or nitrogen ($N_2$). The storage tank 20 contains cryogen in liquid and vapor form. The cryogen in the storage tank 20 is maintained at a predetermined pressure value, such as, for example 300 psi.

As shown in FIGS. 1 and 3, the storage tank 20 of the invention preferably operates with a filling station 24 to reduce the pressure of the cryogen, and direct the reduced pressure cryogen into an accumulator tank 26. The cryogen in the accumulator tank 26 is preferably maintained at approximately 125–135 psi. Because the pressure of the cryogen is reduced in the filling station 24, relatively little vapor is flashed in the evaporator coils (described below) and higher mass flow rates of cryogen can be maintained throughout the cryogenic temperature control apparatus 10. The pressure in the accumulator tank 26 is preferably sufficient to provide the motive force necessary to move the cryogen throughout the cryogenic temperature control apparatus 10. The accumulator tank 26 preferably has a sufficient volume of cryogen to supply the cryogenic temperature control apparatus 10 with a relatively uninterrupted flow of cryogen at the desired pressure, thereby reducing the frequency with which the filling station 24 is required to cycle on and off. Alternatively, in some constructions (not shown), the temperature control apparatus 10 can operate at a higher pressure without using a filling station 24 and an accumulator tank 26.

As shown in FIG. 3, a conduit 28 is connected at one end to a liquid carbon dioxide outlet 30 located on the storage tank 20 and at the other end to a pressure regulator 32. A vapor conduit 34 is connected at one end to a gaseous cryogen outlet 36 of the storage tank 20. The conduit 28 includes a solenoid-operated fill valve 38, which controls the flow of liquid cryogen from the storage tank 20 to the accumulator tank 26. A filter 40 is located downstream from the fill valve 38 and operates to remove ice, dirt, and other impurities from the liquid cryogen.

A relief valve 42 is located downstream from the filter 40 at a branch conduit. The relief valve 42 operates to prevent over pressurization. During normal operation, the pressure in the conduit 28 upstream of the relief valve 42 is between 250 and 300 psi. If the pressure in the conduit 28 exceeds a maximum pressure value, the relief valve 42 is activated to vent excess pressure. At the same time the pressure regulator 32 maintains the pressure lower than the activation pressure of the relief valve 42. The filling station 24 also includes a high-pressure cut-off switch 44 that is electrically connected to a controller 46, and is preferably set to shut off the solenoid operated fill valve 38 if the pressure in the conduit 28 rises above 200 psi downstream from the pressure regulator 32.

The accumulator tank 26 includes an inlet conduit 49 and a check valve 50. A control valve 51 allows liquid cryogen to flow out of the accumulator tank 26 to a refrigeration circuit 52. The control valve 51 is normally closed while the accumulator tank 26 is filled so that liquid cryogen can fill the accumulator tank 26. Once the accumulator tank 26 is filled, the control valve 51 can be opened to supply cryogen to the refrigeration circuit 52. Alternatively, the control valve 51 can remain open during tank filling. A vent conduit 53 extends out of the accumulator tank 26 and is operable to vent off gaseous cryogen created as a result of flashing when the pressure of the liquid cryogen is reduced from about 300 psi to about 125–135 psi. The flash gases are preferably vented out through an outlet 57. The vent conduit 53 includes a vent shut-off valve 47 for sealing the accumulator tank 26 and a level gauge 65, which is operable to monitor cryogen volume. Additionally, in some constructions of the present invention, the level gauge 65 can be used with a controller 46 to stop cryogen filling operations after a prescribed volume of cryogen is transferred.

A back pressure regulator 55 is located upstream from the outlet 57 and preferably maintains the back pressure in the accumulator tank 26 and the vent conduit 53 at approximately 125–135 psi. A pressure line 56 interconnects the pressure regulator 55 and the cryogen vapor in the storage tank 20 to maintain the necessary pressure differential within the back pressure regulator 55 so that the back pressure regulator 55 can perform its function. Cryogenic vapor is exhausted to the atmosphere through an outlet 57, which may in some constructions include a muffler (not shown) that is operable to reduce noise during venting operations. In some constructions, the cryogenic vapor is directed to a recompression/liquefaction apparatus (not shown) that recompresses and liquefies the cryogen before returning the cryogen to the storage tank 20 to be recycled through the temperature control apparatus 10.

As shown FIG. 3, the controller 46 is electrically connected to the solenoid-operated fill valve 38. When the tank level sensor 65 records a liquid level in the accumulator tank 26 that is below a desired level, such as, for example 30% of capacity, the controller 46 initiates a filling operation to refill the accumulator tank 26 with cryogen. In this manner, the cryogenic temperature control apparatus 10 preferably can be operated continuously without starving one or more of the heat exchangers (described below).

In operation, the accumulator tank 26 is normally filled when the control valve 51 is closed and when the shut-off valve 47 is open. However, as mentioned above, in some applications, the control valve 51 can also remain open during tank filling. The controller 46 then opens the fill valve 38. Liquid cryogen pressurized to approximately 300 psi then flows through the conduit 28 into the filling station 24. The pressure regulator 32 lowers the pressure of the liquid cryogen from approximately 300 psi to approximately 125–135 psi, causing some of the cryogen to flash into gas. The liquid/gaseous cryogen mixture then moves into the accumulator tank 26. The gaseous cryogen is expelled through the vent conduit 53 and out the outlet 57. The vent conduit 53 also includes a shut-off valve 55. Once the tank level sensor 65 determines that the accumulator tank 26 is full, the filling operation is discontinued and the solenoid-operated fill valve 38 is closed.

As described above, in some constructions, the present invention can include one or more filling stations 24, which operate to, among other things, lower the pressure of cryogen. One having ordinary skill in the art will appreciate that other assemblies and apparatuses (not shown) can also or alternately be used to lower the pressure of the cryogen before the cryogen is transferred to the refrigeration circuit 52. In other constructions, the pressure of the storage tank 20 can be maintained at a lower level and in these constructions some or all of the above-describe structure may be removed.

Referring now to FIGS. 1–3, the refrigeration circuit 52 extends along the interior of the loading dock 12, fluidly connecting the accumulator tank 26 and the heat exchangers 66. However, one having ordinary skill in the art will appreciate that in some constructions (not shown) at least some portion of the refrigeration circuit 52 may also or alternately be located outside the loading dock 12. The refrigeration circuit 52 preferably includes a relief valve 65 (see FIG. 3).

As shown in FIG. 1, the cryogenic temperature control apparatus 10 includes four heat exchangers 66, one of which is located in each of the docking stalls 14. However, in other constructions, the cryogenic temperature control apparatus 10 can include one, two, three, five, or more heat exchangers 66 located in a similar number of docking stalls 14. Additionally, in some constructions of the present invention, two or more heat exchangers 66 can be located in each of the docking stalls 14. In other constructions, the heat exchangers 66 can be moved between the docking stalls 14 so that, for example, two heat exchangers 66 can be moved between three docking stalls 14 to selectively cool trailers 18, which may be docked at any one of the three docking stalls 14.

As shown in FIGS. 1 and 2, the heat exchangers 66 extend laterally away from the loading dock 12 into the conditioned spaces 16 of trailers 18. In the illustrated construction, a trailer 18 is backed up to the loading dock 12, the trailer door is opened, and the heat exchanger 66 is moved into the trailer 18. As shown in FIG. 2, a cushion seal or skirt 67 extends away from the loading dock 12 and is operable to mate with the trailer 18 to form a thermally insulated seal between the loading dock 12 and the trailer 18. Once the heat exchanger 66 is inserted into the conditioned space 16, an insulated gate (not shown) is drawn across the back of the trailer 18 to prevent heat from within the loading docks 12 from entering the conditioned space 16.

FIG. 3 is a schematic diagram, including a single heat exchanger 66, which is fluidly connected to the accumulator tank 26. However, as shown in FIG. 1, the present invention can include a plurality of heat exchangers 66, which are substantially similar to the heat exchanger 66 shown in FIG. 3 and described hereafter. However, for reasons of brevity and simplicity, the following description will describe an embodiment of the present invention that includes a single heat exchanger 66.

A flow control valve 68 (e.g., solenoid-controlled, manual, proportional, or any suitable mechanism for altering flow), is positioned along the refrigeration circuit 52 to regulate the flow of cryogen out of the storage tank 20 to the heat exchanger 66. In some constructions, the valve 68 has a number of open positions so that the valve 68 can regulate the flow of cryogen out of the accumulator tank 26 to one of the heat exchangers 66. The controller 46 electrically controls the flow of cryogen to the heat exchanger 66 by selectively opening and closing the valve 68. In constructions of the present invention having multiple heat exchangers 66, the refrigeration circuit 52 can include multiple valves 68, each controlling the flow of cryogen to one of the heat exchangers 66.

An evaporator coil 70 and a blower 71 are contained within the heat exchanger 66. Warm air from the conditioned space 16 enters the heat exchanger 66 through an inlet 72. The blower 71 conveys the warm air past the evaporator coil 70, and through an air outlet 73 of the heat exchanger 66. The conditioned air thus enters the conditioned space 16 to regulate the temperature therein. As liquid cryogen flows through the evaporator coil 70, the relatively cold liquid cryogen within the evaporator coil 70 cools the relatively warm air flowing past the evaporator coil 70 before the air is expelled into the conditioned space 16. At the same time, the cryogen in the evaporator coil 70 is vaporized. The outlet 73 includes a baffle 74, which can be opened and closed, either electronically or manually, to control airflow through the heat exchanger 66. The vaporized cryogen is then vented from the evaporator coil 44 to the atmosphere. Because the cryogen is released to the atmosphere, cryogen does not enter the conditioned space 16. In other constructions, the vaporized cryogen can be re-compressed and returned to the storage tank 20 to be recycled through the cryogenic temperature control apparatus 10.

As shown in FIG. 3, a backpressure regulator 75 and temperature sensor 76 are positioned on a second flow path 77 between the evaporator coil 70 and the atmosphere. However, in other constructions (not shown), particularly in constructions in which the intended cryogen is nitrogen, the backpressure regulator 75 can be omitted. Referring again to FIG. 3, the backpressure regulator 75 and the temperature sensor 76 are operable to further regulate the flow of cryogen through the evaporator coil 70. The backpressure regulator 75 is preferably a spring actuated backpressure valve but can also be an electrically operated pressure control valve. As indicated schematically in FIG. 3, the controller 46 is connected to the valve 68, the backpressure regulator 75, the temperature sensor 76, and the blower 71.

The loading dock's internal electrical circuit (not shown) supplies electricity to the blower 71, the controller 46, and other components within the temperature control apparatus 10. It will be readily apparent to one of ordinary skill in the art that the electricity used to operate the blower 71, the controller 46, and other components within the temperature control apparatus 10 can alternatively come from other conventional power sources (not shown), such as, for example, a battery, generator, or fuel cell.

The cryogen flowing through the evaporator coil 70 is often very cold relative to the air to be conditioned. Therefore, water vapor present in the air may accumulate on the exterior of the evaporator coil 70 in the form of frost or ice, reducing heat transfer between the cryogen in the evaporator coil 44 and air in the heat exchanger 36. Therefore, the controller 46 is programmed to periodically operate the cryogenic temperature control apparatus 10 in a defrost mode.

The cryogenic temperature control apparatus 10 shown in FIG. 3 includes a heating element 78. In the illustrated construction, the heating element 78 is a conventional electric heater (in other constructions other heating elements, such as hot water supplies, can also or alternately be used) and is connected to the internal electrical circuit of the loading dock. It will be readily apparent to one of ordinary skill in the art that the power used to drive the heating element 78 could alternatively come from other conventional power sources (not shown), such as, for example a battery, generator, fuel cell, or the like.

During a defrost mode, the controller 46 is programmed to close valve 68, preventing cryogen from entering the evaporator coil 70 and to activate the heating element 78. Additionally, the controller 46 closes the baffle 74. The heating element 78 heats the air in the heat exchanger 36, melting any ice or frost which may have formed on the evaporator coil 44. Alternatively or in addition, the blower 71 may be turned off during the defrost mode.

In some applications it may be necessary to heat the conditioned space 16, particularly in relatively cold climates. For example, heating may be desirable when the ambient air temperature is below the desired conditioned space set point temperature. When heating is required, the controller 46 is programmed to activate the heating element 78 and to close the valve 68, preventing cryogen from entering the evaporator coil 70. The baffle 74 remains open so that the blower 71 can blow air from the conditioned space 16 across the heating element 78. The heated air is then returned to the conditioned space 16 through the outlet 73.

Referring now to FIG. 1, in some constructions, the temperature control apparatus 10 can include a cooling chamber 80, which is coupled to and extends from the loading dock 12. The cooling chamber 80 is particularly useful in applications in which the cryogenic temperature control apparatus 10 is being added to an existing loading dock 12 which may not have the space required to accommodate the heat exchanger 66. Also, the cooling chamber 80 can be used to cool pre-loaded trucks and trailers, which may not have sufficient space to accommodate relatively bulky heat exchangers. The cooling chamber 80 defines an insulated space 81 and includes a heat exchanger 66 (as described above) and a skirt 82. The cooling chamber 80 also includes a main door (not shown) which can be closed when the cooling chamber 80 is not in use to protect the cooling chamber 80 and the heat exchanger 66 contained therein from the elements. The cooling chamber 80 also includes an access door (not shown) which communicates with the loading dock 12.

In operation, a trailer 18 is backed up to the cooling chamber 80 and a seal is formed between the skirt 82 and the trailer 18. Air from the trailer 18 is then cycled through the heat exchanger 66 to condition the temperature of air in the trailer 18.

FIG. 4 illustrates a cryogenic temperature control apparatus 110 according to a second construction of the present invention. The cryogenic temperature control apparatus 110 is similar to the cryogenic temperature control apparatus 10 as previously described and is incorporated in a cooling wall 111 with three stalls 114. In different applications, the cooling wall 111 can be located in any number of different locations but is preferably located in parking lots, truck and bus depots, vehicle maintenance facilities, and the like. As shown in FIG. 4, trailers 118 are parked at two of the stalls 114 and define conditioned spaces 116. The cryogenic temperature control apparatus 110 is preferably operable to rapidly pull down the temperatures in the conditioned spaces 116 to predetermined set point temperatures. In some applications, the temperature control apparatus 110 can also be used to maintain the temperature in one or more of the conditioned spaces 116 at the set point temperatures. In particular, the temperature control apparatus 110 can be used to maintain the temperature of trucks and trailers 118 while the trucks and trailers 118 are parked in a lot waiting to be loaded or unloaded, while maintenance is being done to loaded trailers or trucks, while maintenance is being done to on-board refrigeration units (not shown), and the like.

The cryogenic temperature control apparatus 110 includes a thermally insulated storage tank 120, which is adjacent to the cooling wall 111. The storage tank 120 contains a supply of cryogen, such as carbon dioxide ($CO_2$) or nitrogen ($N_2$). The pressure of the storage tank 120 is maintained at a pre-determined pressure value, such as, for example 300 psi. The storage tank 120 preferably operates with a filling station 124 and an accumulator tank 126 as explained above to reduce the pressure of the cryogen to approximately 125–135 psi.

A refrigeration circuit 152 extends along the cooling wall 111 fluidly connecting the accumulator tank 126 and heat exchangers 166. As shown in FIG. 4, the heat exchangers 166 extend laterally away from the cooling wall 110 and into the conditioned spaces 116 of trailers 118. In operation, a trailer 118 with an open back door is backed up to the cooling wall 110. A cushion seal or skirt 167 extends axially away from the cooling wall 111 and is operable to mate with the trailers 118 to form a thermally insulated seal between the trailer 118 and the cooling wall 111.

The cryogenic temperature control apparatus 110 also includes flow control valves 168 positioned along the refrigeration circuit 152 for controlling the flow of cryogen from the accumulator tank 126 to the heat exchangers 166. A controller 146 preferably electrically controls the flow of cryogen to the heat exchangers 166 by selectively opening and closing the valves 168.

An evaporator coil 170 and a blower 171 are contained within each of the heat exchangers 166. Warm air from the conditioned spaces 116 enters the heat exchangers 166 through inlets 172. The blowers 171 convey the warm air past the evaporator coils 170, and through air-outlets 173 of the heat exchangers 166. The conditioned air thus enters the conditioned spaces 116 to regulate the temperature therein. As the cryogen flows through the evaporator coils 170, the relatively cold liquid cryogen within the evaporator coils 170 cools the relatively warm air flowing past them before the air is expelled into the conditioned spaces 116. The cryogen in the evaporator coils 170 is vaporized and the vaporized cryogen is then vented to the atmosphere.

Each of the heat exchangers 166 preferably include backpressure regulators 175 and temperature sensors 176 for regulating the flow of cryogen through the evaporator coils 170. However, as explained above with respect to the first construction of the present invention, when the cryogen is nitrogen, the cryogenic temperature control apparatus 110 can operate without backpressure regulators 175. The heat exchangers 166 also include heating elements 178 for operating the heat exchangers 166 in heating and defrost modes. As shown in FIG. 4, in some constructions, a cooling chamber 180 can at least partially enclose one or more of the heat exchangers 166, protecting the heat exchanger 166 from the elements.

FIGS. 5 and 6 illustrate a cryogenic temperature control apparatus 210 according to a third construction of the present invention. The cryogenic temperature control apparatus 210 is similar to the cryogenic temperature control apparatuses previously described and is mounted on a vehicle V to be moveable between remote locations and to condition air within a number of conditioned spaces. For example, as shown in FIG. 5, the cryogenic temperature control apparatus 210 can be used to condition a conditioned space 216 defined by a trailer 218, which is parked in a remote location (e.g., a farm field) 214. After the cryogenic temperature control apparatus 210 pulls down the temperature of the conditioned space 216 to a predetermined set point temperature, the cryogenic temperature control apparatus 210 can maintain the temperature of the conditioned space 216 within a desired range surrounding the predetermined set point temperature. Alternatively, the cryogenic temperature control apparatus 210 can be moved to a new location to pull down the temperature of another conditioned space (not shown).

The cryogenic temperature control apparatus 210 includes a storage tank 220 and a heat exchanger 266, both of which are mounted on the vehicle V. The cryogenic temperature control apparatus 210 also includes two fluid conduits for moving air between the conditioned space 216 and the cryogenic temperature control apparatus 210. The first conduit is an air supply tube 267 and the second conduit is an air return tube 268. To improve air flow between the conditioned space 216 and the heat exchanger 266, fans and blowers (not shown) can be positioned within the conditioned space 216 or can be included in the air supply and return tubes 267, 268.

Cryogen flows along a flow path from the storage tank 220 into an evaporator coil (not shown), which extends through the heat exchanger 266 as described above. The blowers draw air from the conditioned space 216 through the air supply tube 267 into the heat exchanger 266 and blow the air across the evaporator coil. As the warm conditioned space air flows across the evaporator coil, the cryogen absorbs heat from the air and is vaporized. The vaporized cryogen is vented to the atmosphere and the cooled air is vented through the air return tube 268 back into the conditioned space 216.

The cryogenic temperature control apparatus 210 can also include a heating element (not shown) for defrosting the heat exchanger 266 and for heating the conditioned space 216, as described above with respect to the other constructions. The heating element is preferably a conventional electric heating coil powered by a power source 270. The power source 270 is preferably mounted on the vehicle V for movement with the cryogenic temperature control apparatus 210 between locations and can also supply power to other elements of the cryogenic temperature control apparatus 210. Alternatively, an external power source such as a battery, generator, or fuel cell (not shown) can supply power to the cryogenic temperature control apparatus 210. In still other constructions, the vehicle's engine can supply power to the temperature control apparatus 210.

Once the temperature of the conditioned space 116 is pulled down to the desired set point temperature, the vehicle V and the cryogenic temperature control apparatus 210 can be moved to a new location to condition the air in other conditioned spaces. Alternatively, the cryogenic temperature control apparatus 210 can be used to maintain the conditioned space 216 at the desired set point temperature for an extended time.

The cryogenic temperature control apparatus 210 can also be used to condition the air in buildings and temporary structures. As shown in FIG. 6, the vehicle V is parked next to a tent 271, which defines a conditioned space 272. The air supply and air return tubes 267, 268 extend between the cryogenic temperature control apparatus 210 and the tent 271, facilitating cooling of the tent 271 in substantially the same manner as described above. In a similar manner, the cryogenic temperature control apparatus 210 can also be used to pull down or maintain the temperature in other conditioned spaces, including refrigerated display cases, buildings, homes, and the like.

FIG. 7 illustrates a cryogenic temperature control apparatus 310 according to a fourth construction of the present invention. The cryogenic temperature control apparatus 310 is substantially similar to the cryogenic temperature control apparatuses previously described. The cryogenic temperature control apparatus 310 is located at or near bus and truck depots, repair facilities, loading docks, and other locations where trucks, buses, vans, and the like are parked.

The cryogenic temperature control apparatus 310 includes a thermally insulated or vacuum storage tank 320, which contains a supply of cryogen, such as carbon dioxide ($CO_2$) or nitrogen ($N_2$) that has an elevated pressure. In the illustrated construction, the storage tank 320 is a stationary storage tank. However, in other constructions (not shown), the storage tank 320 can be a moveable storage tank. More particularly, in some constructions, the storage tank 320 can be mounted on a vehicle that is moveable between remote locations to condition a number of conditioned spaces. For example, the cryogenic temperature control apparatus 310 can be used to condition a conditioned space defined by a trailer, which is parked in a remote location (e.g., a farm field). After the cryogenic temperature control apparatus 310 pulls down the temperature of the conditioned space to a predetermined set point temperature, the cryogenic temperature control apparatus 310 can maintain the temperature of the conditioned space within a desired range surrounding the predetermined set point temperature. Alternatively, the cryogenic temperature control apparatus 310 can be moved to a new location to pull down the temperature of another conditioned space.

In applications of the present invention in which the storage tank 320 houses carbon dioxide, the carbon dioxide is preferably maintained at approximately 275–300 psi. In other applications, the cryogen can be maintained at other pressures, depending, at least in part, upon the particular cryogen used. The storage tank 320 operates with a filling station 324 and an accumulator tank 326 to reduce the pressure of the cryogen from the storage tank 320 to a pressure of approximately 125–135 psi as explained above with respect to the other constructions of the present invention.

Flexible supply conduits 352 are connected to the accumulator tank 326 and are used to supply cryogen to condition conditioned spaces in vehicles. As shown in FIG. 7, one supply conduit 352 extends between the accumulator tank 326 and a bus B and another supply conduit 352 extends between the accumulator tank 326 and a truck T. The cryogenic temperature control apparatus 310 of the present invention preferably includes a number of supply conduits 352. However, for simplicity, only two supply conduits 352 are illustrated and described herein.

The truck T and the bus B define conditioned spaces 316. The temperature control apparatus 310 of the present invention is preferably operable to rapidly pull down and maintain the temperatures in the air-conditioned spaces 316 at predetermined set point temperatures. Alternatively or in addition, the temperature control apparatus 310 can provide supplemental cooling to the conditioned spaces 316, acting with on-board mobile cooling systems to condition the air in the conditioned spaces 316.

As shown in FIG. 7, the truck T and the bus B each include a mobile cooling system 330. The mobile cooling systems 330 are conventional mechanical cooling or air conditioning systems, which are commonly mounted on one end of trailers, trucks, or buses to maintain cargo transported in the trailer, truck, or bus at a desired set point temperature during transportation. Similarly, the mobile cooling systems 330 can be used to provide passenger comfort in buses, vans, and the like. The mobile cooling systems 330 utilize a hydroflurocarbon-based refrigerant, a compressor (not shown) that raises the pressure of the refrigerant, a condenser (not shown) connected to the compressor to condense the high pressure refrigerant from a gas to a liquid, an expansion valve (not shown) for controlling refrigerant flow to an evaporator 332, an internal-combustion engine 333 that provides power to the cooling system 330, and blowers 346, which circulate air through the cooling systems 330. The evaporators 332 include evaporator coils 334, which are enclosed by heat exchanger housings 336. The heat exchanger housings 336 include inlets 338 through which conditioned space air enters the heat exchanger housings 336 and outlets 340 through which conditioned space air reenters the conditioned spaces 316.

Warm conditioned space air flows into the inlets 338, continues across the evaporator coils 334 and is discharged through the outlets 340. As the refrigerant flows through the evaporator coils 334, the refrigerant absorbs heat from the conditioned space air, and in this way pulls down or maintains the temperature of the conditioned spaces 316 at predetermined set point temperatures.

Secondary evaporator coils 344 extend through the heat exchanger housings 336. Ports 348 are positioned on the outside of the bus B and the truck T and communicate with the evaporator coils 344. When rapid pull down or supplemental cooling is required, the flexible supply conduits 352 are connected to the ports 348 via quick-connect couplers 354. The quick-connect couplers 354 preferably include check valves (not shown) that operate to prevent cryogen flow after the flexible supply conduits 352 have been disconnected from the ports 348.

Warm air from the conditioned spaces 316 enters the heat exchanger housings 336 through the inlets 338. Blowers 346 convey the warm air past the secondary evaporator coils 344, and through the outlets 340. The conditioned air thus enters the conditioned spaces 316 to regulate the temperature therein. As the liquid cryogen flows through the secondary evaporator coils 344, the relatively warm air vaporizes the cryogen. The vaporized cryogen continues through the secondary evaporator coils 344 and is vented to the atmosphere through a discharge flow path 349 and a discharge vent 350. Alternatively, a recovery conduit (not shown) can be connected to the discharge vent 350 to recover the vaporized cryogen. The recovered cryogen can then be directed to a compressor (not shown) and a condenser (not shown) that re-compresses and re-condenses the cryogen so that the cryogen can be recycled through the cryogenic temperature control apparatus 310.

Backpressure regulators (not shown) and temperature sensors 360 are positioned on the discharge flow paths 349 between the secondary evaporator coils 344 and the atmosphere. The backpressure regulators and the temperature sensors 360 are operable to further regulate the flow of cryogen through the secondary evaporator coils 344.

FIG. 8 illustrates a cryogenic temperature control apparatus 410 according to a fifth construction of the present invention. The cryogenic temperature control apparatus 410 is substantially similar to the previously described cryogenic temperature control apparatuses. The cryogenic temperature control apparatus 410 is particularly well suited for pre-cooling trucks, trailers, buses, vans, and the like. Additionally, the cryogenic temperature control apparatus 410 is well suited for providing emergency or supplemental cooling to trucks, trailers, vans, and the like during repairs to mobile conditioning systems.

The cryogenic temperature control apparatus 410 is mounted on a wheeled cart 412 for movement between locations. The cryogenic temperature control apparatus 410 also includes a cooling chamber 414, an outer wall 416 that at least partially encloses the cooling chamber 414, and an opening 418 that extends through the outer wall 416 into the interior of the cooling chamber 414.

In operation, the wheeled cart 412 is moved into position adjacent to a vehicle, such as a truck, trailer, bus, van or the like so that the opening 418 communicates with the interior of the vehicle. In this manner, the cryogenic temperature control apparatus can condition air within a conditioned space defined by the truck or the trailer.

As shown in FIG. 8, the cryogenic temperature control apparatus 410 includes a thermally insulated or vacuum storage tank 420 that is mounted on the wheeled cart 412.

The storage tank 420 contains a supply of cryogen, such as carbon dioxide ($CO_2$) or nitrogen ($N_2$). A fluid conduit 422 connects the storage tank 420 and a heat exchanger 424.

A flow control valve 426 (e.g., solenoid-controlled, manual, proportional, or any other suitable mechanism for altering flow), is positioned along the fluid conduit 422 to regulate the flow of cryogen out of the storage tank 420 to the heat exchanger 424. Preferably, a controller 428 controls the flow of cryogen to the heat exchanger 424 by selectively opening and closing the valve 426.

The heat exchanger 424 houses an evaporator coil 432 and a blower 434. The evaporator coil 432 is in fluid communication with the fluid conduit 422 to receive cryogen from the storage tank 420. When the cryogenic temperature control apparatus 410 is connected to a vehicle, warm air from the vehicle enters the heat exchanger 424 through an inlet 438. The blower 434 conveys the warm air past the evaporator coil 432, and through an air outlet 440 of the heat exchanger 424. The conditioned air thus re-enters the vehicle to regulate the temperature therein. As the liquid cryogen flows through the evaporator coil 432, the relatively cold liquid cryogen within the evaporator coil 432 cools the relatively warm air flowing past it before the air is returned to the vehicle. Contact with the relatively warm air vaporizes the cryogen in the evaporator coil 432. The vaporized cryogen is vented from the evaporator coil 432 through a vent conduit 442 to the atmosphere.

A back pressure regulator 444 is positioned along the vent conduit 442 for further controlling the flow of cryogen through the evaporator coil 432. The back pressure regulator 444 is preferably a spring actuated back pressure valve but can also be a manually operated pressure valve, a pneumatic operated valve, or any other conventional regulating valve.

As shown in FIG. 8, the cryogenic temperature control apparatus 410 includes an onboard power supply 446, such as a battery or a fuel cell. The power supply 446 supplies electrical power to the controller 428, the blower 434, and other elements of the cryogenic temperature control apparatus 410. In other constructions, generators, internal-combustion engines, and the like can supply electrical power to the cryogenic temperature control apparatus 410. In still other constructions, one or more power cords (not shown) convey electrical current to the cryogenic temperature control apparatus 410 from other power sources such as electrical outlets and the like.

Various independent features of the present invention are set forth in the following claims.

What is claimed is:

1. A cryogenic temperature control apparatus for conditioning air in a plurality of conditioned spaces, the plurality of conditioned spaces being spaced apart and being thermally separated, the cryogenic temperature control apparatus comprising:

a storage tank housing a cryogen;

an evaporator coil being selectively moveable into and out of the plurality of conditioned spaces for alternately conditioning air in the plurality of conditioned spaces; and a flow path fluidly connecting the storage tank and the evaporator coil.

2. The cryogenic temperature control apparatus of claim 1, wherein the flow path is a flexible fluid conduit.

3. The cryogenic temperature control apparatus of claim 1, wherein the flow path includes a valve for regulating the back pressure in the evaporator coil and the flow path.

4. The cryogenic temperature control apparatus of claim 1, wherein at least one of the conditioned spaces is a trailer.

5. The cryogenic temperature control apparatus of claim 1, wherein at least one of the conditioned spaces is a vehicle.

6. The cryogenic temperature control apparatus of claim 1, further comprising:

a second evaporator coil being selectively moveable into and out of the plurality of conditioned spaces for alternately conditioning air in the plurality of conditioned spaces; and a second flow path fluidly connecting the storage tank and the second evaporator coil.

7. The cryogenic temperature control apparatus of claim 1, wherein the cryogen is carbon dioxide.

8. The cryogenic temperature control apparatus of claim 1, further comprising a fan in fluid communication with the evaporator coil, the fan being oriented to selectively draw air from at least one of the plurality of conditioned spaces and to direct air across the evaporator coil.

9. The cryogenic temperature control apparatus of claim 1, further comprising a fluid conduit, the fluid conduit selectively fluidly connecting the evaporator coil and at least one of the plurality of conditioned spaces.

10. The cryogenic temperature control apparatus of claim 1, further comprising a heat exchanger selectively movable into and out of the plurality of conditioned spaces, the evaporator coil extending through the heat exchanger.

11. The cryogenic temperature control apparatus of claim 1, wherein the cryogenic temperature control apparatus is coupled to a loading dock, and wherein at least one of the plurality of conditioned spaces is the load space of a trailer.

12. A cryogenic temperature control apparatus for conditioning the temperature of air in a plurality of thermally separated conditioned spaces, the plurality of conditioned spaces being located in a plurality of locations, the cryogenic temperature control apparatus comprising:
 a storage tank housing a cryogen; and
 a mobile heat exchanger moveable between the plurality of locations, the mobile heat exchanger being alternately insertable into the plurality of conditioned spaces to alternately condition air in the plurality of conditioned spaces, the mobile heat exchanger including an evaporator coil extending through the heat exchanger, and a flow path fluidly connecting the storage tank and the evaporator coil.

13. The cryogenic temperature control apparatus of claim 12, wherein the storage tank is coupled to the mobile heat exchanger for transportation with the mobile heat exchanger between the plurality of locations.

14. The cryogenic temperature control apparatus of claim 12, wherein the flow path is a flexible fluid conduit.

15. The cryogenic temperature control apparatus of claim 12, wherein the flow path includes a valve for regulating the back pressure in the evaporator coil and the flow path.

16. The cryogenic temperature control apparatus of claim 12, wherein at least one of the conditioned spaces is a trailer.

17. The cryogenic temperature control apparatus of claim 12, wherein at least one of the conditioned spaces is a vehicle.

18. The cryogenic temperature control apparatus of claim 12, further comprising a second mobile heat exchanger moveable between the plurality of locations, the second mobile heat exchanger being alternately thermally connectable with the plurality of conditioned spaces to alternately condition air in the plurality of conditioned spaces, the second mobile heat exchanger including a second evaporator coil extending through the second heat exchanger, and a second flow path fluidly connecting the storage tank and the second evaporator coil.

19. The cryogenic temperature control apparatus of claim 12, wherein the cryogen is carbon dioxide.

20. The cryogenic temperature control apparatus of claim 12, further comprising a fan in fluid communication with the heat exchanger, the fan being oriented to selectively draw air from at least one of the plurality of conditioned spaces and to direct air through the heat exchanger.

21. The cryogenic temperature control apparatus of claim 12, further comprising a fluid conduit, the fluid conduit selectively fluidly connecting the evaporator coil and at least one of the plurality of conditioned spaces.

22. The cryogenic temperature control apparatus of claim 12, further comprising a heat exchanger selectively movable into and out of the plurality of conditioned spaces, the evaporator coil extending through the heat exchanger.

23. The cryogenic temperature control apparatus of claim 12, wherein the cryogenic temperature control apparatus is coupled to a loading dock, and wherein at least one of the plurality of conditioned spaces is the load space of a trailer.

24. A method of controlling the temperature of a plurality of conditioned spaces with a cryogenic temperature control apparatus, the cryogenic temperature control apparatus including a storage tank housing a cryogen, an evaporator coil, and a flow path fluidly connecting the storage tank and the evaporator coil, the plurality of conditioned spaces being located in a plurality of locations, the method comprising:
 removably inserting the evaporator coil into at least one conditioned space;
 transferring cryogen through the flow path from the storage tank to the evaporator coil;
 transferring heat from the at least one conditioned space to the cryogen; and
 moving the evaporator coil out of the at least one conditioned space.

25. The method of claim 24, further comprising:
 removably thermally connecting the evaporator coil and an other of the plurality of conditioned spaces;
 transferring cryogen through the flow path from the storage tank to the evaporator coil;
 transferring heat from the other of the conditioned spaces to the cryogen; and
 moving the evaporator coil out of thermal communication with the other of the conditioned spaces.

26. The method of claim 24, wherein the cryogenic temperature control apparatus includes a heat exchanger at least partially enclosing the evaporator coil, the method further comprising moving air from at least one of the conditioned spaces into the heat exchanger and exhausting air from the heat exchanger into the at least one conditioned space.

27. A method of controlling the temperature of a plurality of conditioned spaces with a cryogenic temperature control apparatus, the cryogenic temperature control apparatus including a storage tank housing a cryogen, an evaporator coil, and a flow path fluidly connecting the storage tank and the evaporator coil, the plurality of conditioned spaces being located in a plurality of locations, the method comprising:
 removably thermally connecting the evaporator coil and at least one conditioned space;
 transferring cryogen through the flow path from the storage tank to the evaporator coil;
 transferring heat from the at least one conditioned space to the cryogen; and
 moving the evaporator coil out of thermal communication with the at least one conditioned space;
 wherein the storage tank has a first pressure, the cryogenic temperature control apparatus includes a second tank, and further comprising transferring cryogen from the storage tank to the second tank and changing the pressure of the cryogen from the first pressure to a second pressure.

28. A method of pulling down the temperature of air in a plurality of thermally separated conditioned spaces with a moveable cryogenic temperature control apparatus, the moveable cryogenic temperature control apparatus including a storage tank housing a cryogen, an evaporator coil, and a flow path fluidly connecting the storage tank and the evaporator coil, the method comprising:
 moving the evaporator coil into at least one of the plurality of conditioned spaces;
 moving air from the at least one conditioned space across the evaporator coil;
 moving cryogen through the evaporator coil;
 transferring heat from the at least one conditioned space to the cryogen; and
 moving the evaporator coil out of the at least one of the plurality of conditioned spaces.

29. The method of claim 28, further comprising:
 moving the evaporator coil into thermal communication with an other of the plurality of conditioned spaces;
 moving air from the other conditioned space across the evaporator coil;
 moving cryogen through the evaporator coil;
 transferring heat from the other conditioned space to the cryogen; and moving the evaporator coil out of thermal communication with the other of the plurality of conditioned spaces.

30. The method of claim 28, wherein the cryogenic temperature control apparatus includes a heat exchanger at least partially enclosing the evaporator coil, the method further comprising moving air from at least one of the conditioned spaces into the heat exchanger and exhausting air from the heat exchanger into the at least one conditioned space.

31. A method of providing supplemental cooling to a moveable conditioned space, the moveable conditioned space including a mechanical refrigeration unit having a quantity of a refrigerant and an evaporator coil, the method including:

fluidly connecting the evaporator coil to a supply of cryogen;

moving air from the conditioned space across the evaporator coil;

moving cryogen through the evaporator coil;

transferring heat from the conditioned space to the cryogen; and fluidly disconnecting the evaporator coil and the supply of cryogen.

32. The method of claim 31, further comprising venting the cryogen out of the evaporator coil.

* * * * *